(12) United States Patent
Chen

(10) Patent No.: US 7,375,279 B2
(45) Date of Patent: May 20, 2008

(54) WATERPROOF COVER FOR AN AUDIO SYSTEM

(76) Inventor: Kuan-Wei Chen, No. 46, Lane 69, Sec. 2, Jianguo S. Rd., Da-An Dist., Taipei (TW)

( * ) Notice: Subject to any disclaimer, the term of this patent is extended or adjusted under 35 U.S.C. 154(b) by 349 days.

(21) Appl. No.: 11/179,513

(22) Filed: Jul. 13, 2005

(65) Prior Publication Data

US 2007/0013271 A1    Jan. 18, 2007

(51) Int. Cl.
    *H02G 3/14* (2006.01)
(52) U.S. Cl. .................... 174/66; 174/67; 174/50; 174/17 CT; 220/241
(58) Field of Classification Search .............. 174/66, 174/67, 50, 53, 17 CT; 220/241, 242, 3.8; 312/7.1; 361/600; D13/156; 16/260, 334; 439/535; 248/906
See application file for complete search history.

(56) References Cited

U.S. PATENT DOCUMENTS

| 3,000,049 | A | 9/1961 | Terry, Jr. |
| 3,352,613 | A | 11/1967 | Morris |
| 4,381,063 | A | 4/1983 | Leong |
| 4,390,114 | A | 6/1983 | Sviatoslavsky et al. |
| 4,500,008 | A | 2/1985 | Cook |
| 4,536,005 | A | 8/1985 | Tanaka et al. |
| 4,734,955 | A | 4/1988 | Connor |
| 4,974,289 | A | 12/1990 | Piard |
| 5,068,765 | A | 11/1991 | Nimpoeno |
| 5,109,572 | A | 5/1992 | Park |
| 5,255,965 | A * | 10/1993 | Chen et al. .................. 312/7.1 |
| 5,533,637 | A | 7/1996 | Williams, Jr. |
| 5,845,803 | A | 12/1998 | Saito et al. |
| 5,924,782 | A | 7/1999 | Park |
| 6,133,531 | A | 10/2000 | Hayduke et al. |
| 6,512,178 | B2 | 1/2003 | Goodman |
| 6,797,884 | B2 | 9/2004 | Kubota |
| 6,921,141 | B1 | 7/2005 | Porco |

FOREIGN PATENT DOCUMENTS

DE    EP0883127    12/1998

* cited by examiner

*Primary Examiner*—Dhiru R. Patel
(74) *Attorney, Agent, or Firm*—Bacon & Thomas, PLLC

(57) ABSTRACT

A waterproof cover for an audio system includes a frame having an opening and two arcuate faces respectively formed on two opposed sides of the frame, a gasket and a shield with the gasket securely attached to a side face thereof and being pivotally connected to the frame in such a way that a pivotal trajectory of the shield is eccentric to the arcuate face thereby allowing the shield together with the gasket to engage with the arcuate faces of the frame in a watertight manner.

17 Claims, 6 Drawing Sheets

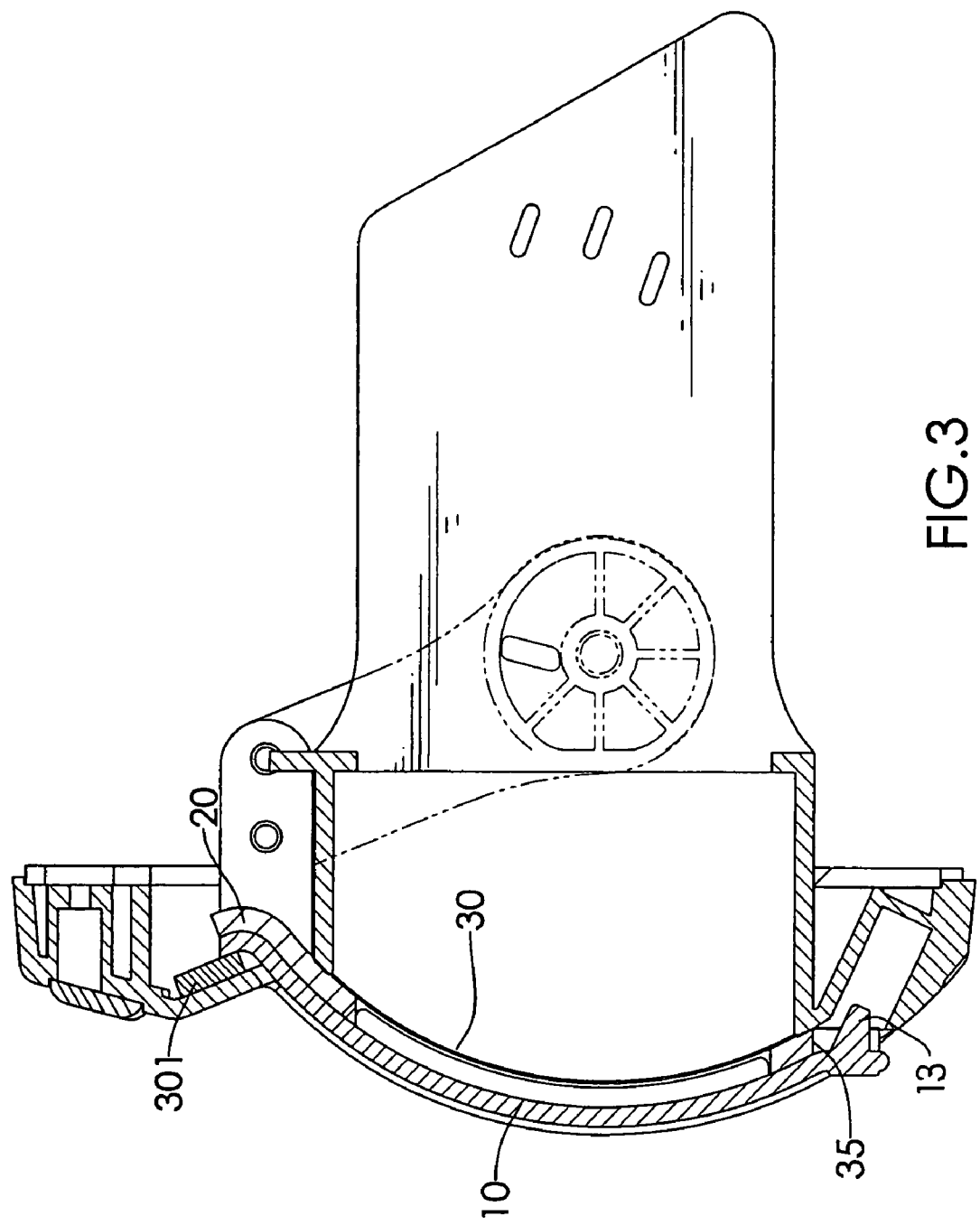

WATERPROOF COVER FOR AN AUDIO SYSTEM

BACKGROUND OF THE INVENTION

1. Field of the Invention

The present invention relates to a waterproof cover, and more particularly to a waterproof cover for protecting an audio system from water.

2. Description of Related Art

In outdoor activities, an audio system including items such as a loudspeaker, a CD player or a radio for reproducing music is a requirement. However, the audio system has a control panel that will often be affected by water in some situations such as boats, leisure spas etc. Therefore, the audio system generally has a waterproof cover mounted in front of the control panel.

A conventional waterproof cover has an inner gasket, a frame, an outer gasket and a shield.

The inner gasket is mounted at a first side of the frame and has a first opening defined therethrough. The frame has a second opening defined therethrough and corresponding to the first opening.

The outer gasket is mounted at a second side of the frame. The shield has a tongue protruded from a rear side thereof. Two lugs are formed at two ends of the tongue and positioned in the apertures respectively. Therefore, the shield is pivotally mounted on the frame.

In use, the waterproof cover is mounted in front of the control panel of the audio system. Blocked by the inner gasket and the outer gasket, water cannot dampen the control panel, and the audio system is protected.

However, limited by the manufacturing technology, the shield, the outer gasket and the frame can not be tightly assembled together, and gaps exist between the shield and the outer gasket and between the outer gasket and the frame, so water can penetrate the gaps, and the audio system may be seriously damaged by the water.

Therefore, the invention provides a waterproof cover to mitigate or obviate the aforementioned problems.

SUMMARY OF THE INVENTION

The main objective of the present invention is to provide a waterproof cover for an audio system that is waterproof to completely prevent water from dampening the audio system.

Other objectives, advantages and novel features of the invention will become more apparent from the following detailed description when taken in conjunction with the accompanying drawings.

BRIEF DESCRIPTION OF THE DRAWINGS

FIG. 3 is a cross sectional side view of the waterproof cover in FIG. 2;

DETAILED DESCRIPTION OF THE PREFERRED EMBODIMENT

Figure 1:
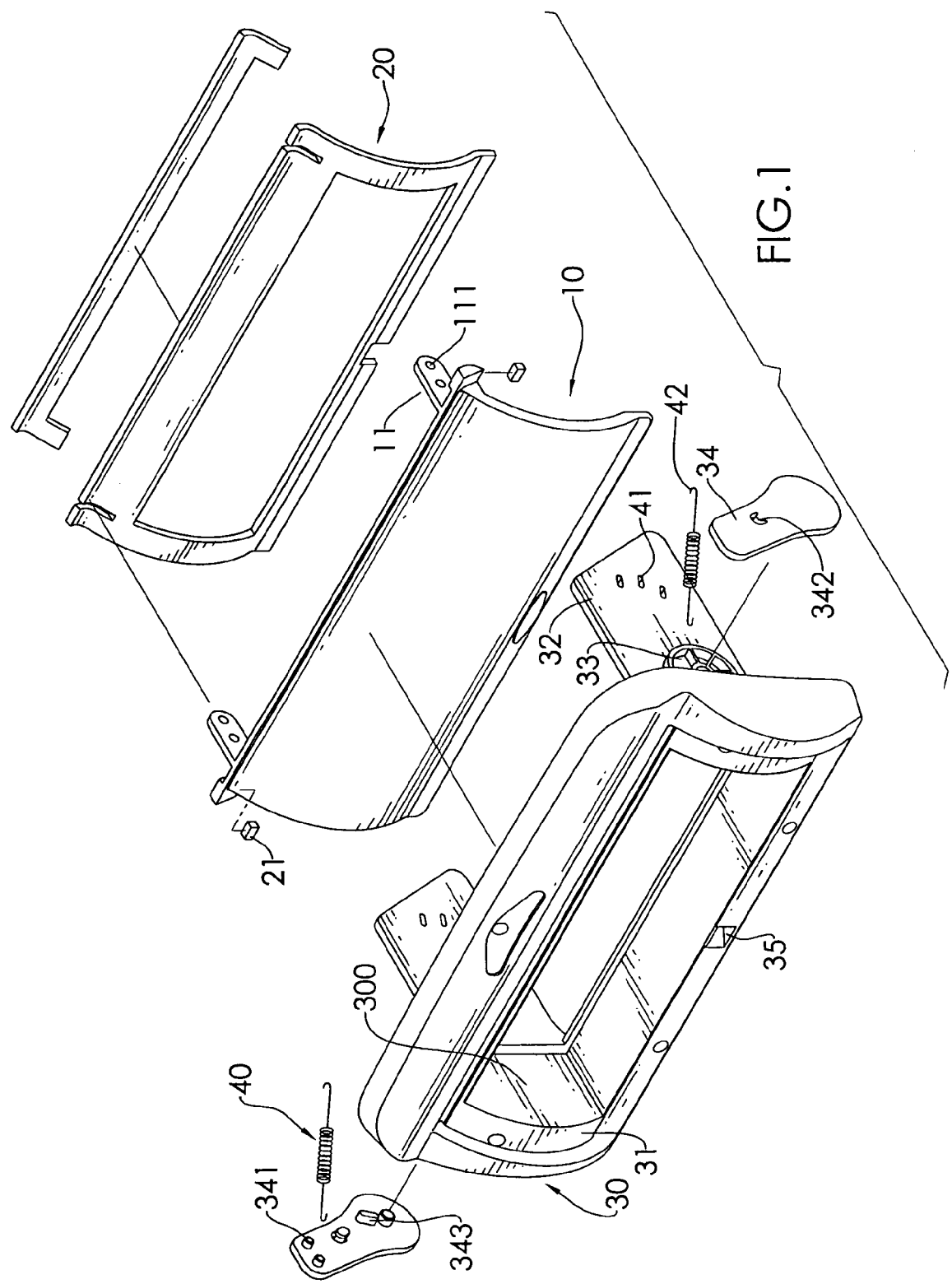
FIG. 1 is an exploded perspective view of a waterproof cover for an audio system in accordance with the present invention.

With reference to FIG. 1, a waterproof cover is composed of a shield (10), a gasket (20), a frame (30) and a recovery force adjusting assembly (40).

The shield (10) has two extensions (11) oppositely extending out of the shield (10) and respectively having holes (111) defined in a free end of the extension (11).

The gasket (20) has a configuration the same as that of the shield (10) and is securely attached to an inner side of the shield (10). Especially, the gasket (20) is able to form a waterproof padding on an outer peripheral edge of the shield (10).

The frame (30) can be installed in front of a control panel of an audio system including items such as a loudspeaker, a CD player or a radio (not shown). An opening (300) is defined through the frame (30) and two arcuate faces (31) are respectively formed on two lateral sides of the frame (30). Two positioning legs (32) protrude from a rear face of the frame (30), and each positioning leg (32) has a pivot seat (33) formed on an outer side of each of the positioning legs (32). Two arms (34) are provided to pivotally connect each one of the positioning legs (32) to the shield (10).

The recovery force adjusting assembly (40) includes adjusting holes (41) and two springs (42). Each spring (42) connects one positioning leg (32) to one arm (34) so that when the arm (34) is pivoted relative to the frame (30), the spring (42) is able to provide a recovery force to pull the arm (34) back to a closed position.

Figure 2:
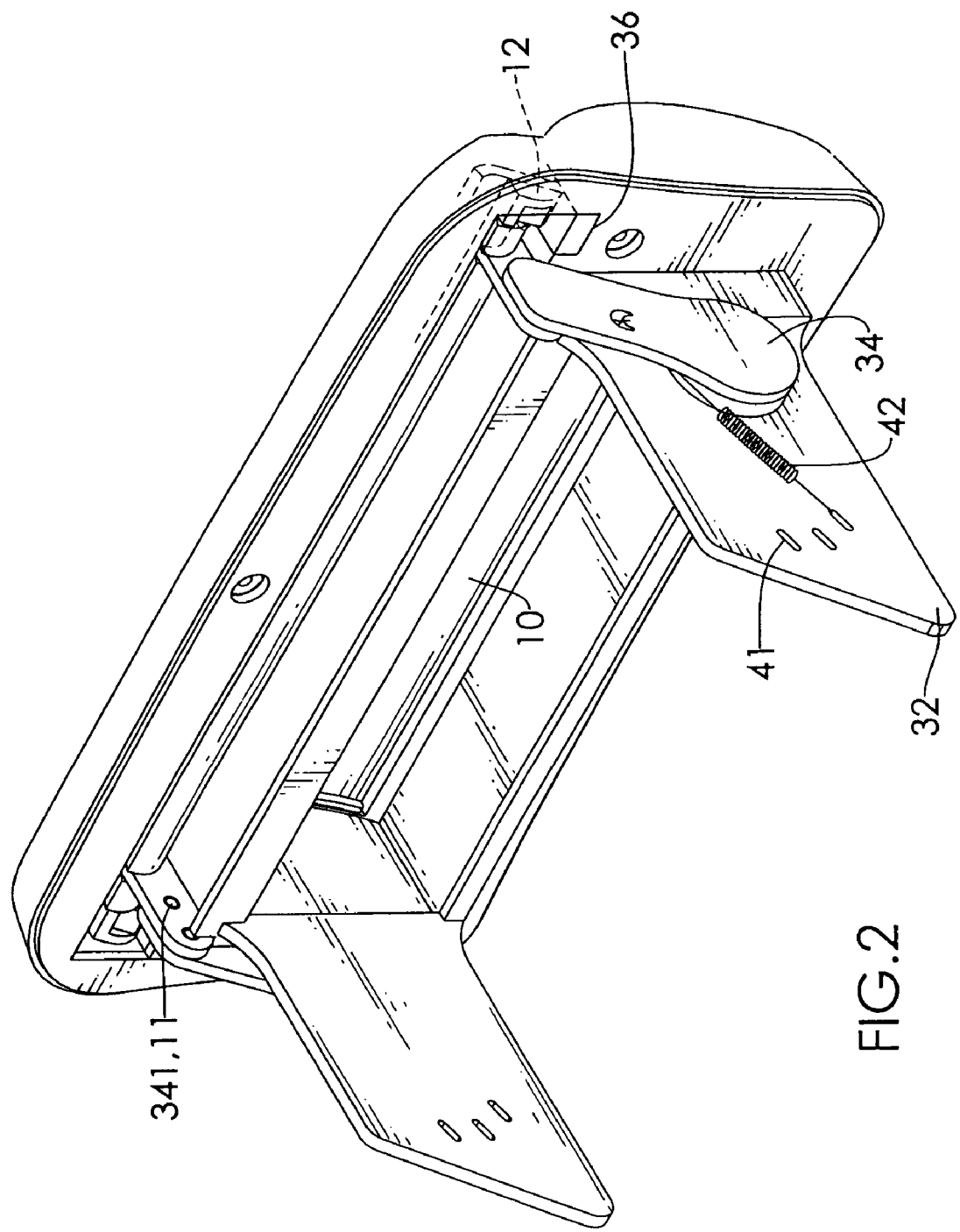
FIG. 2 is a perspective view of the waterproof cover in FIG. 1.

With reference to FIG. 2 and still using FIG. 1 for reference, when the waterproof cover of the present invention is assembled, the gasket (20) is first securely attached to the shield (10). Then the two arms (34) are pivotally connected respectively to the two pivot seats (33) at one end of each arm (34). The other ends of each of the two arms (34) are then securely and firmly connected to the shield (10) by inserting bosses (341) into the holes (111). Thereafter, the two springs (42) are securely attached between the arms (34) and the positioning legs (32). In order to accomplish the attachment of the spring (42) to both the arm (34) and the positioning leg (32), each of the arms (34) is provided with an ear (342) formed on an outer face thereof, and each of the positioning legs (32) is provided with multiple adjusting holes (41). Thus one end of the spring (42) is connected to the ear (342) and the other end of the spring (42) engages one of the adjusting holes (41). Because there is only one ear (342) on each of the arms (34) and multiple adjusting holes (41), extension of the spring (42) can be varied so that a user is able to adjust the extension of the spring (42) and the recovery force to the shield is adjusted.

Figure 2A:
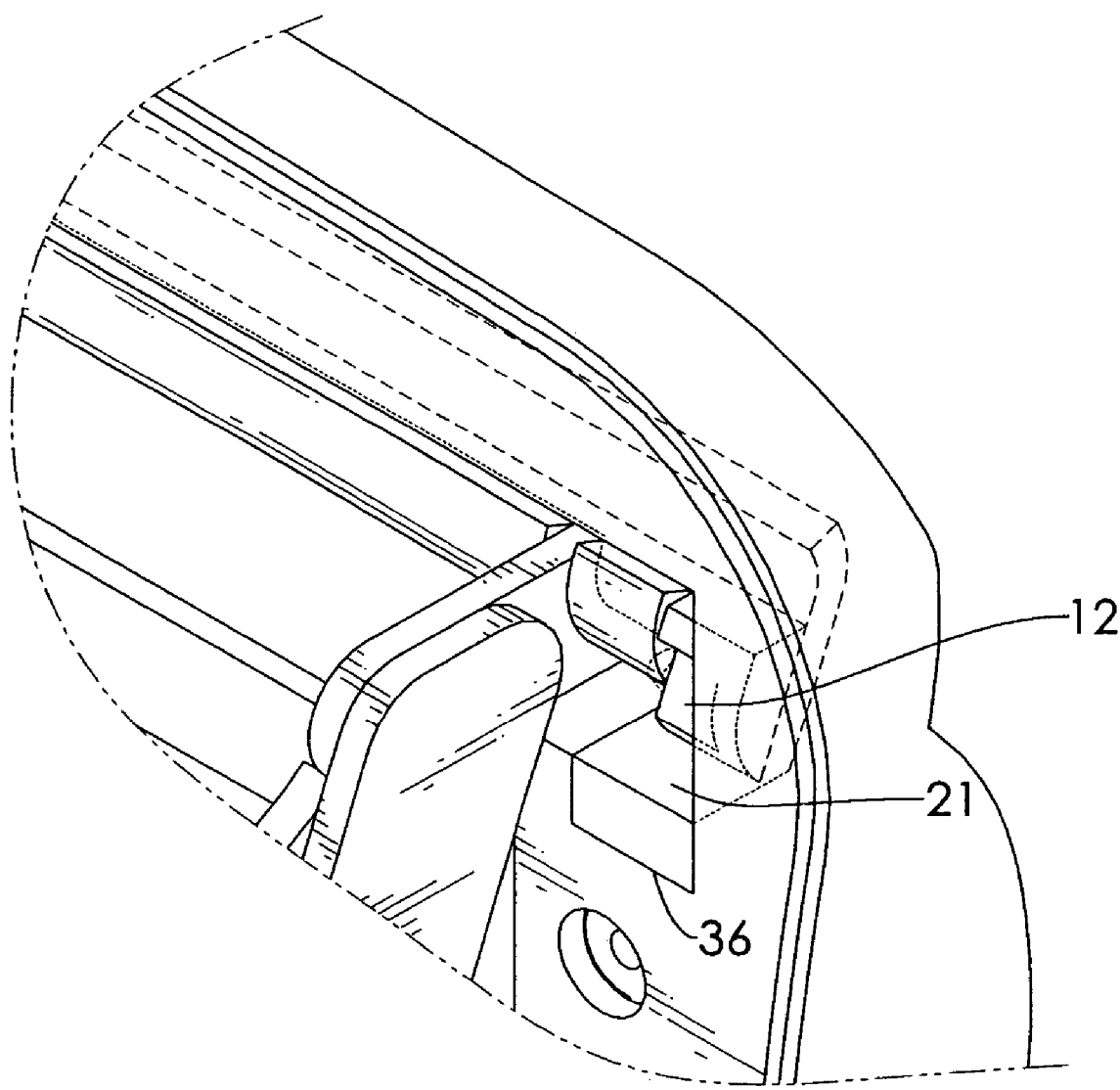
FIG. 2A is an enlarged perspective view of the frame and the shield in FIG. 2.

With the springs (42), the arms (34) and the shield (10) are able to pivot relative to the frame (30). With reference to FIG. 2A, the shield (10) has two abutting ends (12) extending respectively from two opposite sides of the shield (10), and the frame (30) has two recesses (36) defined in two opposite sides of the frame (30) to correspond to the two abutting ends (12) of the shield (10) and to receive therein a pad (21) made of a material the same as that of the gasket (20). Therefore, when the shield (10) is pivoted relative to the frame (30), the abutting ends (12) will abut the pad (21) to prevent water leakage from sides of the frame (30).

With reference to FIG. 3, to enhance engagement between the shield (10) and the frame (30), a hook (13) is formed on a side face of the shield (10), and a positioning recess (35) is defined in a side face of the frame (30) between the two arcuate faces (31). Thus when the hook (13) is received in the positioning recess (35), the shield (10) is held against the frame (30). Furthermore, a waterproof pad (301) is securely attached to an inner side face of the frame (30) such that no matter what position the shield (10) is, the waterproof pad (301) is able to ensure that moisture is completely blocked outside the shield (10).

Figure 4:
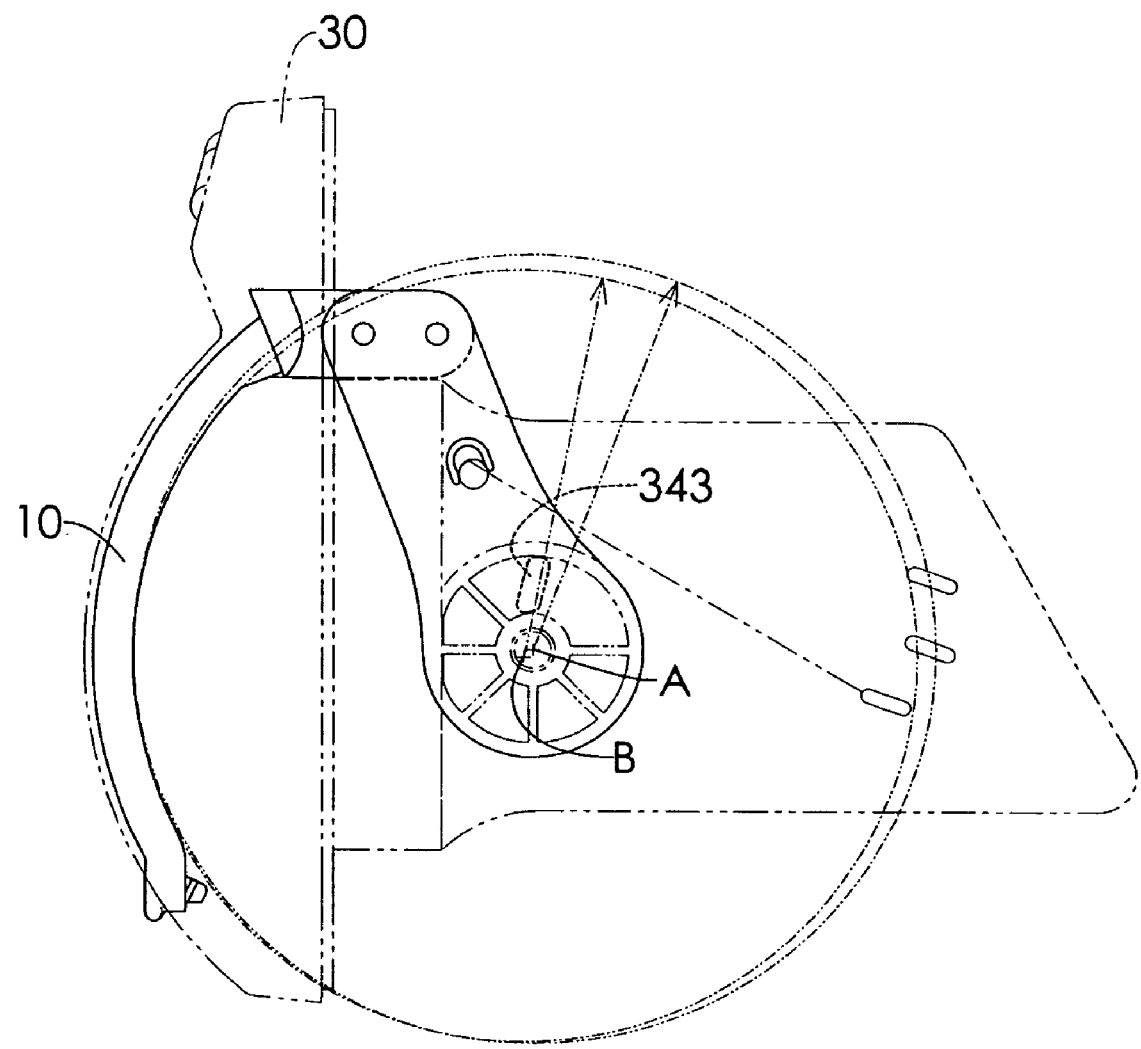
FIG. 4 is an operational side view of the waterproof cover in FIG. 2 in a closed position.
Figure 5:
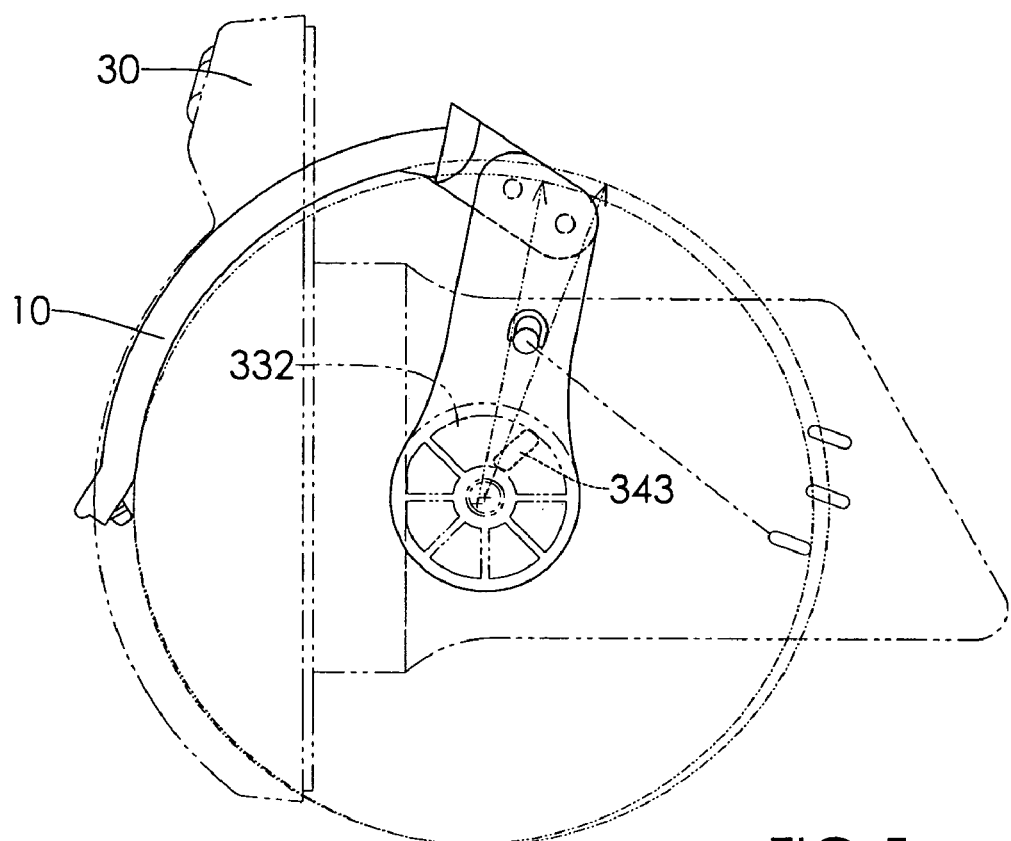
FIG. 5 is an operational side view of the waterproof cover in FIG. 2 being opened.
Figure 6:
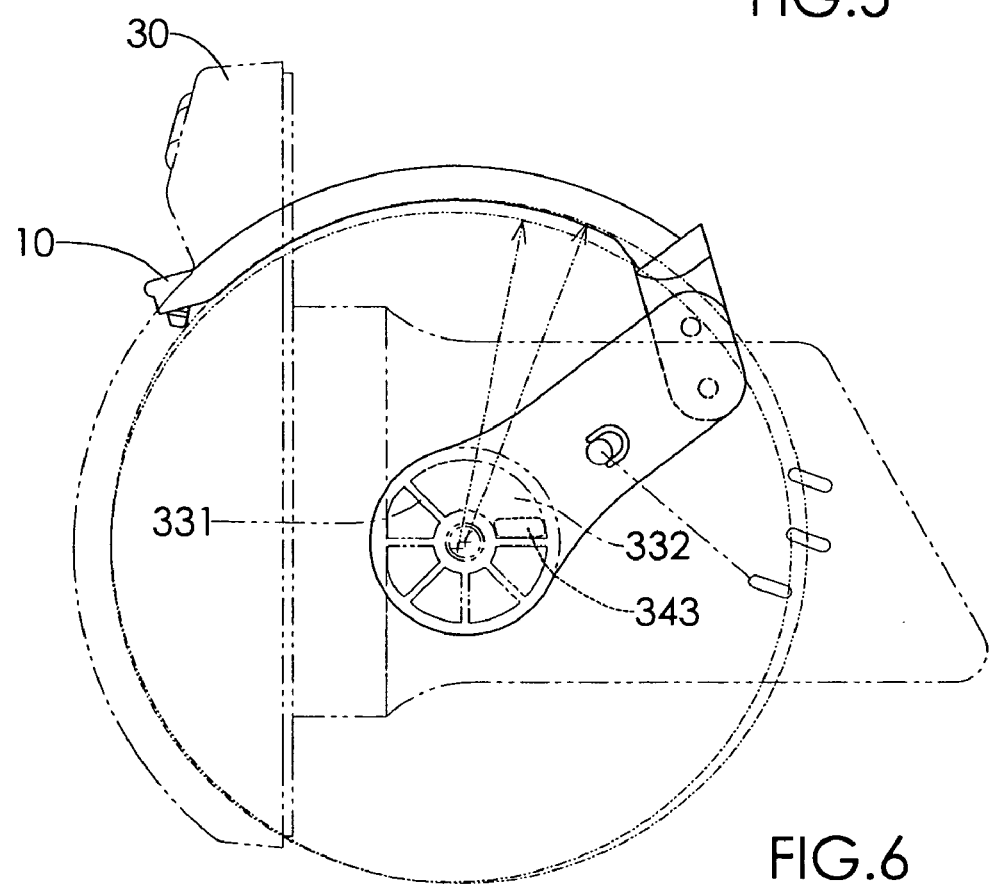
FIG. 6 is an operational side view of the waterproof cover in FIG. 2 in an open position.

With reference to FIGS. 4, 5 and 6, the pivot seat (33) is located at a position A, which is an origin of the trajectory of the pivotal movement of the shield (10) but not an origin B of the arcuate face (31) of the frame (30). That is, the location of the pivot seat (33) is eccentric to the arcuate face (31). As a result of this non-concentric feature of the shield (10) to the arcuate face (31), before the shield (10) is moved, the shield (10) is able to securely connect to the frame (30) in a watertight manner due to the provision of the gasket (20). However, after the shield (10) is moved by removing the hook (13) away from the corresponding positioning recess (35), the moving trajectory of the shield (10) does not correspond to an imaginary circle constituted by the origin B, which helps the shield (10) to engage the arcuate faces (31) of the frame (30) in a watertight manner.

From the above description, the concept of this invention is simple and thus the entire structure is easy and compact. However, the waterproof effect is far better than any of the conventional waterproof covers on the market.

Furthermore, to prevent excessive pivotal movement of the shield (10) relative to the frame (30), a stop (343) is formed on an inner side of each of the arms (34), and the pivot seat (33) has a pivot space (332) defined by two limiting plates (331) formed in the pivot seat (33). Therefore, the stop (343) always moves inside the pivot space (332) and the shield (10) and the frame (30) is protected.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A waterproof cover for an audio system, the waterproof cover comprising:
   a frame having an opening, two arcuate faces formed respectively on two opposite sides of the frame, two positioning legs protruding from a rear face of the frame and a waterproof pad securely attached to an inner side face of the frame;
   a gasket; and
   a shield with the gasket securely attached to an inner side of the shield and being pivotally connected to the positioning legs of the frame by two arms, each of the legs corresponding to each of the arms, in such a way that a pivotal trajectory of the shield is eccentric to the arcuate face thereby allowing the shield together with the gasket to engage the arcuate faces of the frame so that the waterproof pad is able to prevent moisture from entering the frame.

2. The waterproof cover as claimed in claim 1, wherein each of the positioning legs has a pivot seat formed on an outer side of the positioning leg to pivotally connect to the a corresponding one of the arms.

3. The waterproof cover as claimed in claim 2, wherein the shield has two extensions each being securely connected to a corresponding one of the arms.

4. The waterproof cover as claimed in claim 3, wherein each of the arms has bosses corresponding to holes defined in each extension of the shield such that after the bosses are inserted into the holes, engagement between the extension and the arm is secured.

5. The waterproof cover as claimed in claim 2, wherein a recovery force adjusting assembly is provided between each of the arms and the corresponding positioning leg to adjust a recovery force to bring the arm back to its closed position after being pivoted.

6. The waterproof cover as claimed in claim 5, wherein the recovery force adjusting assembly is provided between each of the arms and the corresponding positioning leg and includes a spring sandwiched between the arm and the corresponding positioning leg and adjusting holes defined in each of the two positioning legs so that the recovery force to the arms after being pivoted is able to be adjusted, the shield has two abutting ends extending respectively from two opposite sides of the shield, and the frame has two recesses defined in two opposite sides of the frame to correspond to the two abutting ends and to receive therein two pads so as to prevent water leakage from sides of the frame when the shield is pivoted relative to the frame.

7. The waterproof cover as claimed in claim 6, wherein the pivot seat has a pivot space defined by two limiting plates formed inside the pivot seat, and each of the arms has a stop received inside the pivot space such that the pivotal movement of each of the arms relative to the frame are limited to prevent excessive pivotal movement.

8. The waterproof cover as claimed in claim 3, wherein a recovery force adjusting assembly is provided between each of the arms and the corresponding positioning leg to adjust a recovery force to bring the arm back to a closed position after being pivoted.

9. The waterproof cover as claimed in claim 8, wherein the recovery force adjusting assembly is provided between each of the arms and the corresponding positioning leg and includes a spring sandwiched between the arm and the corresponding positioning leg and adjusting holes defined in each of the two positioning legs so that the recovery force to the arms after being pivoted is able to be adjusted, the shield has two abutting ends extending respectively from two opposite sides of the shield, and the frame has two recesses defined in two opposite sides of the frame to correspond to the two abutting ends and to receive therein two pads so as to prevent water leakage from sides of the frame when the shield is pivoted relative to the frame.

10. The waterproof cover as claimed in claim 9, wherein the pivot seat has a pivot space defined by two limiting plates formed inside the pivot seat, and each of the arms has a stop received inside the pivot space such that the pivotal movement of each of the arms relative to the frame are limited to prevent excessive pivotal movement.

11. The waterproof cover as claimed in claim 8, wherein the pivot seat has a pivot space defined by two limiting plates formed inside the pivot seat, and each of the arms has a stop received inside the pivot space such that the pivotal movement of each of the arms relative to the frame are limited to prevent excessive pivotal movement.

12. The waterproof cover as claimed in claim 4, wherein a recovery force adjusting assembly is provided between each of the arms and the corresponding positioning leg to adjust a recovery force to bring the arm back to a closed position after being pivoted.

13. The waterproof cover as claimed in claim 12, wherein the recovery force adjusting assembly is provided between each of the arms and the corresponding positioning leg and includes a spring sandwiched between the arm and the corresponding positioning leg and adjusting holes defined in each of the two positioning legs so that the recovery force to the arms after being pivoted is able to be adjusted, the shield has two abutting ends extending respectively from two opposite sides of the shield, and the frame has two recesses defined in two opposite sides of the frame to correspond to the two abutting ends and to receive therein two pads so as to prevent water leakage from sides of the frame when the shield is pivoted relative to the frame.

14. The waterproof cover as claimed in claim 13, wherein the pivot seat has a pivot space defined by two limiting plates formed inside the pivot seat, and each of the arms has a stop received inside the pivot space such that the pivotal movement of each of the arms relative to the frame are limited to prevent excessive pivotal movement.

15. The waterproof cover as claimed in claim 12, wherein the pivot seat has a pivot space defined by two limiting plates formed inside the pivot seat, and each of the arms has a stop received inside the pivot space such that the pivotal movement of each of the arms relative to the frame are limited to prevent excessive pivotal movement.

16. The waterproof cover as claimed in claim 1, wherein a recovery force adjusting assembly is provided between the each of the arms and the corresponding positioning leg to adjust a recovery force to bring the arm back to a closed position after being pivoted.

17. The waterproof cover as claimed in claim 16, wherein the recovery force adjusting assembly is provided between each of the arms and the corresponding positioning leg and includes a spring sandwiched between the arm and the corresponding positioning leg and adjusting holes so that the recovery force to the arms after being pivoted is able to be adjusted, the shield has two abutting ends extending respectively from two opposite sides of the shield, and the frame has two recesses defined in two opposite sides of the frame to correspond to the two abutting ends and to receive therein two pads so as to prevent water leakage from sides of the frame when the shield is pivoted relative to the frame.

* * * * *